US005506599A

United States Patent [19]
Iwama

[11] Patent Number: 5,506,599
[45] Date of Patent: Apr. 9, 1996

[54] ACTIVE MATRIX LIQUID CRYSTAL DISPLAY APPARATUS WITH VARYING PULSE WIDTHS AND A CONSTANT PULSE WIDTH-PULSE HEIGHT PRODUCT

[75] Inventor: Jun Iwama, Kanagawa, Japan

[73] Assignee: Sony Corporation, Tokyo, Japan

[21] Appl. No.: 295,545

[22] Filed: Aug. 25, 1994

[30] Foreign Application Priority Data

Sep. 1, 1993 [JP] Japan .................................... 5-240409

[51] Int. Cl.$^6$ ........................... G09G 3/36; G02F 1/1343; G02F 1/137

[52] U.S. Cl. ................................ 345/94; 345/90; 359/55; 359/84

[58] Field of Search ................................ 359/54, 55, 84; 345/84, 94, 96, 58, 62, 148, 89, 99, 147

[56] References Cited

U.S. PATENT DOCUMENTS

| | | | |
|---|---|---|---|
| 4,845,473 | 7/1989 | Matsuhashi et al. | 345/103 |
| 5,032,831 | 7/1991 | Kuijk | 359/60 |
| 5,075,683 | 12/1991 | Ghis | 345/148 |

FOREIGN PATENT DOCUMENTS

| | | | |
|---|---|---|---|
| 0349415 | 1/1990 | European Pat. Off. . | |
| 0554851 | 8/1993 | European Pat. Off. . | |
| 4-265931 | 9/1992 | Japan . | |
| 2134686 | 8/1984 | United Kingdom . | |
| 2173336 | 10/1986 | United Kingdom | 345/96 |
| WO93/06586 | 4/1993 | WIPO | 345/94 |

OTHER PUBLICATIONS

Howard et al, "Eliminating Crosstalk in Thin–Film Transistor/Liquid Crystal Displays", *IEEE Transactions on Electron Devices,* vol. 36, No. 9–I, Sep. 1989.

*Primary Examiner*—Anita Pellman Gross
*Assistant Examiner*—Walter Malinowski
*Attorney, Agent, or Firm*—Hill, Steadman & Simpson

[57] ABSTRACT

To restrain cross-talk caused by floating capacitance of switching elements contained in an active matrix liquid crystal display apparatus, the active matrix liquid crystal display apparatus includes a matrix structure in which there are scanning lines and signal lines which intersect with each other in the form of a matrix and liquid crystal pixels and switching elements are arranged at the intersections. The signal lines are comprised of transparent electrodes formed in liquid crystal cells, and the scanning lines are comprised of discharge channels formed in plasma cells. The discharge channels are formed by cathodes and anodes and function as switching elements. A scanning circuit selects the switching elements row by row through the cathodes. A drive circuit writes signal voltages through the selected switching elements into the respective liquid crystal pixels via the transparent electrodes. The drive circuit distributes pulses having pulse heights corresponding to the signal voltages to the liquid crystal pixels, and controls the pulses so that the product of the pulse height and the pulse width is the same for all the pulses.

7 Claims, 4 Drawing Sheets

ACTIVE MATRIX LIQUID CRYSTAL DISPLAY APPARATUS WITH VARYING PULSE WIDTHS AND A CONSTANT PULSE WIDTH-PULSE HEIGHT PRODUCT

BACKGROUND OF THE INVENTION

This invention relates to an active matrix liquid crystal display apparatus and for example to a plasma address type active matrix liquid crystal display apparatus having a laminated panel structure in which display cells and addressing plasma cells are superimposed, or to an active matrix liquid crystal display apparatus having a monolayer panel structure in which switching elements and pixel electrodes are integrally formed on the same substrate.

DESCRIPTION OF THE PRIOR ART

The structure of a conventional active matrix liquid crystal display apparatus of the plasma address type will be briefly described with reference to FIG. 3. A liquid crystal display apparatus of the plasma address type is disclosed, for example, in Japanese Laid-Open Patent Publication H.4-265931. As shown in FIG. 3, column transparent electrodes 2 are formed in the form of stripes on the inner surface of an upper glass substrate 1 and constitute signal lines. Row discharge electrodes 4 are formed in the form of stripes on a lower glass substrate 3 and alternately function as anodes A and cathodes K. Ribs 5 are formed along the respective discharge electrodes 4. The edge portions of the discharge electrodes 4 are exposed in regions surrounded by adjacent ribs 5 and constitute stripe-shaped row discharge channels which correspond to scanning lines. The lower glass substrate 3 is joined to an intermediate substrate 6 consisting of a thin plate glass or the like to form a plasma cells. The above-mentioned upper glass substrate 1 is joined to the upper surface of the intermediate substrate 6 with a predetermined gap being provided between the two, 9 and liquid crystal 7 is held in the gap to constitute a liquid crystal cell. Thus a liquid crystal display apparatus of the plasma address type has a laminated panel structure in which plasma cells and liquid crystal cells are superimposed on each other. A polarizing plate or a back-light or the like is required, depending upon the type of the liquid crystal 7; however, it is omitted from FIG. 3.

As described above, the stripe-shaped column transparent electrodes formed in the liquid crystal cell correspond to signal lines. Also, the stripe-shaped row discharge channels formed in the plasma cell correspond to scanning lines. The liquid crystal pixels are regulated by the intersecting portions of the row transparent electrodes and the column discharge channels. The discharge channels located at the intersecting portions constitute switching elements.

FIG. 4 shows an equivalent circuit of the liquid crystal display apparatus of the plasma address type shown in FIG. 3. Liquid crystal pixels 8 are equivalently represented by a series of capacitances CL of the liquid crystal 7 and the intermediate substrate 6. One end of each pixel capacitance CL is connected to a drive circuit through a transparent electrode 2. In the figure, the drive circuits are schematically represented by signal sources 10 corresponding to the respective transparent electrodes 2. The other end of each pixel capacitance is connected to an anode A through a plasma switching element 9. As described above, the plasma switching elements 9 equivalently represent the function of the row discharge channels. When a predetermined voltage is sequentially applied to the cathodes K to generate plasma within the row discharge channels, the switching elements 9 are equivalently turned ON so that the liquid crystal pixels are connected to the anodes A. The respective anodes A are set to a potential equal to a reference potential of the signal sources 10. As a result, a predetermined signal voltage is written in the liquid crystal pixels 8. When they are not being selected, since no plasma is generated in the discharge channels, the respective switching elements 9 are OFF. Therefore, the signal voltages written in the liquid crystal pixels 8 are held. In the OFF state, it is desirable that the plasma switching elements 9 have infinitely high impedance. However, in fact, there exist floating capacities (Cp) 11 within the discharge channels. The floating capacitance 11 include, for example, capacitance components of the ribs 5 shown in FIG. 3, and the like.

FIG. 5 shows a signal voltage/transmittance characteristic of a liquid crystal pixel. In this example, a signal voltage is varied between a minimum value VL and a maximum value VH to obtain a desired gradient display. That is, when the signal voltage is at the level of the minimum value VL, the transmittance of the liquid crystal pixel becomes maximum, whereas when the signal voltage is at the level of the maximum value VH, the transmittance becomes minimum and the so-called normally white mode is performed.

FIG. 6 shows the waveform of a signal voltage. In this example, a signal voltage is inverted in polarity every one field period to effect a.c. drive of the liquid crystal pixels. One field period Tf corresponds to one vertical period 1V in a linear sequential scanning of the row discharge channels. As shown in the figure, the signal voltage has a positive polarity during a first field period and varies between the minimum value +VL and the maximum value +VH. During the succeeding field period, the signal voltage changes between –VL and –VH. A signal voltage Vn is written onto the liquid crystal pixel at a certain selection timing $t_n$, and a signal voltage Vn+1 is written onto the succeeding liquid crystal pixel at the succeeding selection timing $t_{n+1}$. A signal voltage Vn+2 is further written onto the next liquid crystal pixel at the next selection timing $t_{n+2}$. Each selection period TH corresponds to one horizontal period 1H in the linear sequential scanning of the row discharge channels.

FIG. 7 likewise shows an example of the waveform of a signal voltage. In this example, a.c. drive wherein the polarity of the signal voltage is inverted every 1 H is performed. As shown in the figure, a signal voltage +Vn is written onto a liquid crystal pixel at a certain selection timing $t_n$, and a signal voltage Vn+1 is written onto the succeeding liquid crystal pixel at the succeeding selection timing $t_{n+1}$. A signal voltage Vn+2 is written onto the next liquid crystal pixel at the next selection timing $t_{n+2}$.

FIG. 8 shows the variation with time of a signal voltage of a certain liquid crystal pixel in field inversion drive. For example, it will be assumed that a certain liquid crystal pixel is selected at a selection timing $t_n$, and a signal voltage Vn is written and held. Ideally, as indicated by a dotted line, the signal voltage Vn written onto the liquid crystal pixel should be kept constant throughout one field period. However, in fact as shown in FIG. 6, the signal voltage of interest is affected by signal voltages applied to other liquid crystal pixels and fluctuates, as indicated by a solid line in FIG. 8. That is, because there exist the floating capacitance Cp, signal voltages at and after the succeeding selection timing $t_{n+1}$ are superimposed thereon at a certain rate. For example, at the succeeding selection timing $t_{n+1}$ the written signal voltage Vn fluctuates by the amount of $+\beta \times Vn+1$. Here, the coefficient β is determined by the pixel capacity CL and the floating capacity Cp; that is, β, is roughly given by Cp/(CL+Cp), and for example β sometimes reaches about 10%.

In this way, because the floating capacitance exists on the switching element side, the signal voltages written onto the respective liquid crystal pixels are not constant and fluctuate throughout one field period. Therefore, the transmittances of the respective liquid crystal pixels are controlled by an effective voltage throughout one field period. For example, in the case where a signal voltage applied to a certain signal line is inclined toward the maximum value VH side and a signal voltage applied to another signal line is inclined toward the minimum value VL side, a large difference in effective voltage is produced therebetween, resulting in so-called cross-talk, which markedly deteriorates the display quality, and this is a problem. For example, tailing in a vertical direction on window display or the like occurs.

The occurrence of cross-talk was described above with reference to an example of a one-field inversion drive. An example of a one-line inversion drive also produces cross-talk in the same manner. As shown in FIG. 9, when considering that a predetermined signal voltage is written onto a certain liquid crystal pixel at a selection timing $t_n$, $-\beta\times Vn+1$ is superimposed thereon at the succeeding selection timing $t_{n+1}$ due to the above-mentioned floating capacitance. Thereafter, the voltage components to be superimposed are inverted every one line. When the signal voltage level is inclined, the effective voltage of the liquid crystal pixel fluctuates from Vn. That is, the effective voltage is influenced by the signal voltage written in the liquid crystal pixel belonging to other scanning lines to thereby produce cross-talk.

SUMMARY OF THE INVENTION

In view of the above-mentioned problems with the conventional apparatus, an object of the invention is to suppress cross-talk caused by the floating capacitance of the above-mentioned switching elements.

To achieve the above object, the present invention provides the following. An an active matrix liquid crystal display apparatus in accordance with the invention includes, as a fundamental structure, a matrix structure in which scanning lines and signal lines intersect with each other in the form of a matrix, and liquid crystal pixels and switching elements are disposed at the intersections. Furthermore, the active matrix liquid crystal display apparatus of the invention includes a scanning circuit for selecting switching elements through the scanning lines row by row and a driving circuit for writing signal voltages onto the respective liquid crystal pixels through the selected switching elements via the signal lines. The invention is characterized in that the above-mentioned driving circuit includes means for distributing pulses having pulse heights corresponding to the signal voltages to the respective liquid crystal pixels and for controlling the pulses so that the products of the pulse heights and the pulse widths are always kept constant.

The present invention can be embodied, for example, in an active matrix liquid crystal display apparatus of the plasma address type. This liquid crystal apparatus of the plasma address type has a flat panel structure in which a liquid crystal cell and a plasma cell are superimposed on each other. In this specific example, the above-mentioned signal lines consist of stripe-shaped column transparent electrodes formed in the liquid crystal cell, and the above-mentioned scanning lines consist of stripe-shaped row discharge channels formed in the plasma cell. Also, the above-mentioned liquid crystal pixels are regulated as liquid crystal regions positioned at the intersections of the column transparent electrodes and the row discharge channels, and the above-mentioned switching elements are regulated as discharge channel regions similarly positioned on the intersections.

The present invention can also be applied to an active matrix liquid crystal display apparatus utilizing switching circuit elements such as transistors, instead of the plasma switching elements. In this case, the above-mentioned signal lines and the scanning lines are comprised of wiring patterns formed on a primary substrate, and the above-mentioned switching elements consist of switching circuit elements similarly formed on the primary substrate. Further, the above-mentioned liquid crystal pixels comprise pixel electrodes similarly formed on the primary substrate, opposed electrodes formed on an opposed substrate and a liquid crystal region interposed between both of the electrodes.

According to the present invention, when switching elements are selected row by row through the scanning lines and signal voltages are written through the selected switching elements via the signal lines onto the respective liquid crystal pixels to display an image, pulses having pulse heights corresponding to the signal voltages are distributed to the respective liquid crystal pixels and the pulses are controlled so that the products of the pulse heights and the pulse widths are always kept constant. In other words, the individual pulses always have a constant pulse area regardless of the signal voltage. Therefore, even though pulse components assigned to other scanning lines are superimposed on the pulse of interest through the floating capacitance, the effective voltages of the superimposed pulses throughout the one-field period are constant. That is, the effective voltages of the fluctuation components are equal to each other between signal lines. Therefore, when one-line inversion drive is performed, because there is no effective voltage difference in the fluctuation components between signal lines, cross-talk is inconspicuous. Further, when one-line inversion drive is performed, particularly because the fluctuation component every line is offset, the effective voltages of the respective liquid crystal pixels coincide with the signal voltage levels which were written and held in them, and cross-talk can be almost completely removed.

DETAILED DESCRIPTION OF THE PREFERRED EMBODIMENTS

Figure 1:
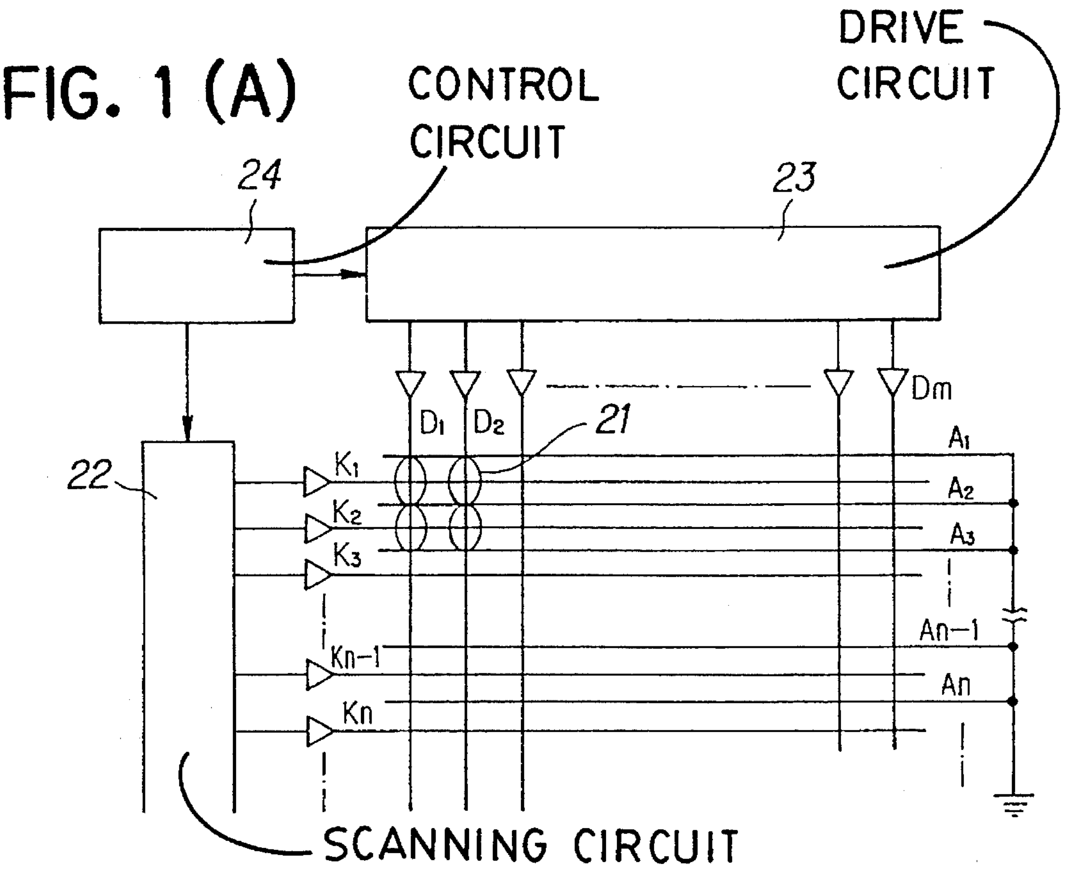
FIG. 1(A) is a schematic circuit diagram and FIGS. 1(B) and 1(C) are waveform diagrams of an active matrix liquid crystal display apparatus in accordance with one embodiment of the present invention.
Figure 1:
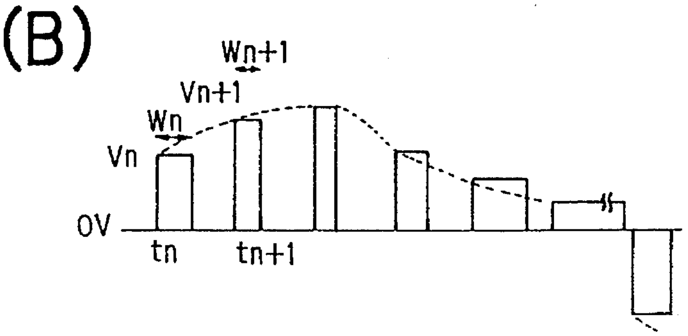
Figure 1:
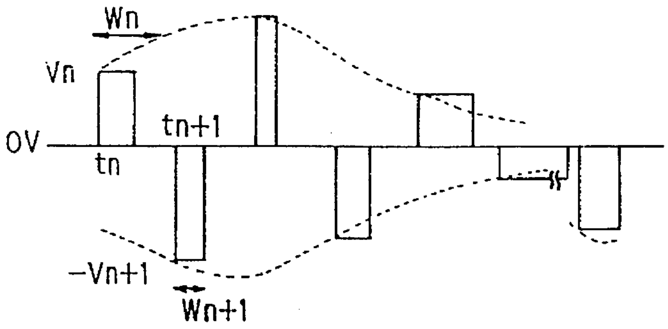
Figure 3:
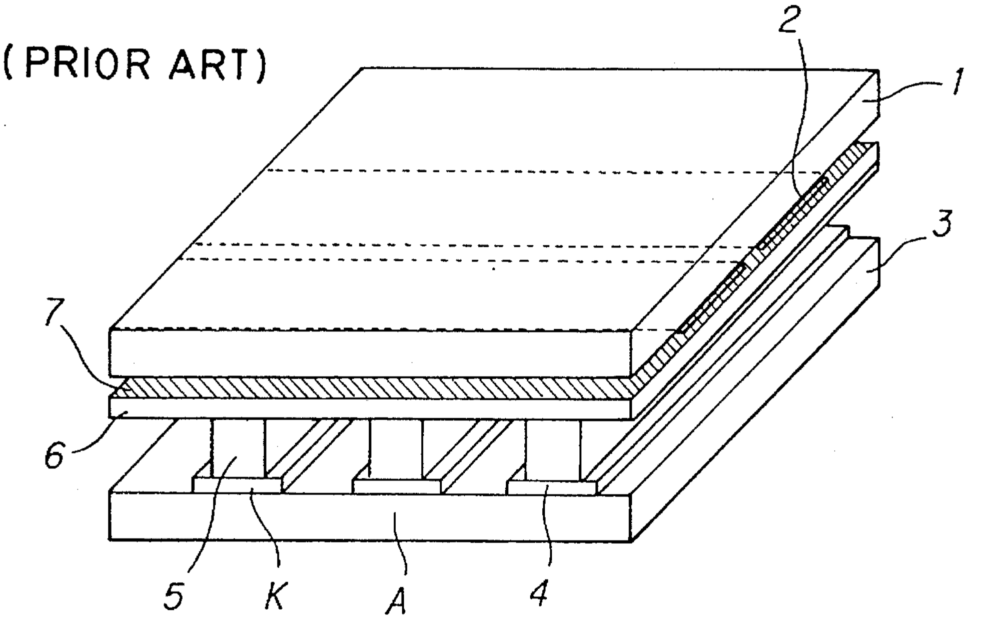
FIG. 3 (PRIOR ART)
FIG. 3 is a perspective view showing a general structure of a conventional active matrix liquid crystal display apparatus of the plasma address type.
Figure 4:
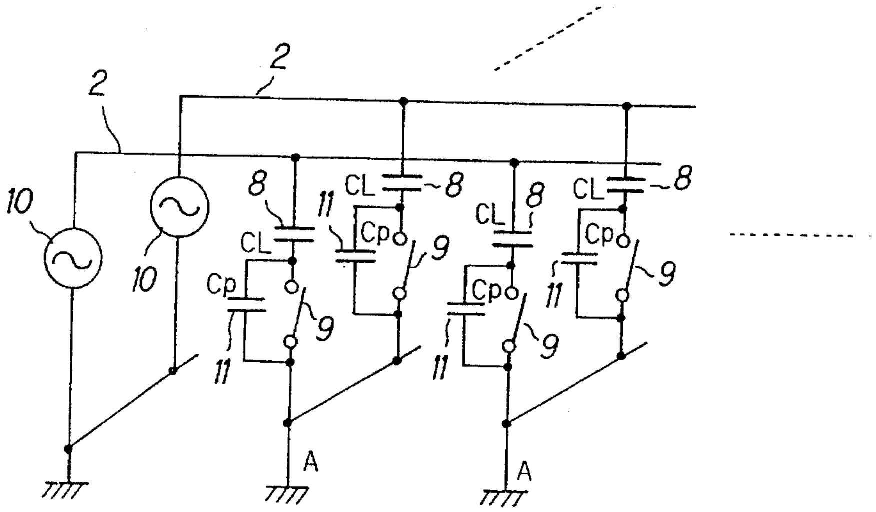
FIG. 4 (PRIOR ART)
FIG. 4 is an equivalent circuit diagram of the liquid crystal display apparatus shown in FIG. 3.
Figure 5:
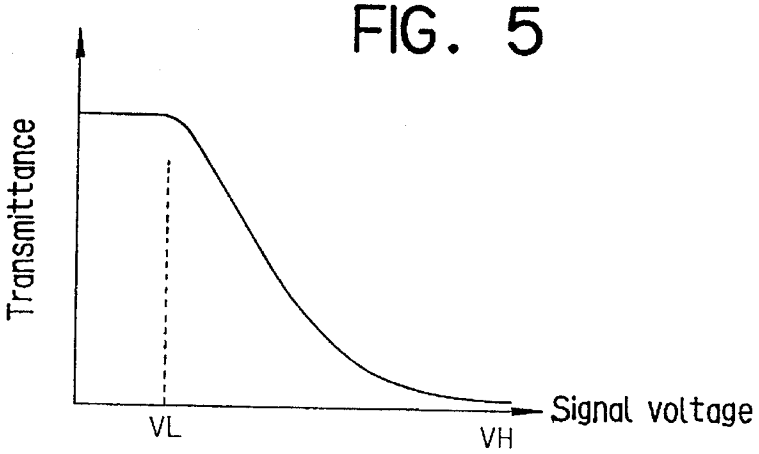
FIG. 5 is a graph showing a transmittance/signal voltage characteristic of the active matrix liquid crystal display apparatus shown in FIG. 3.
Figure 6:
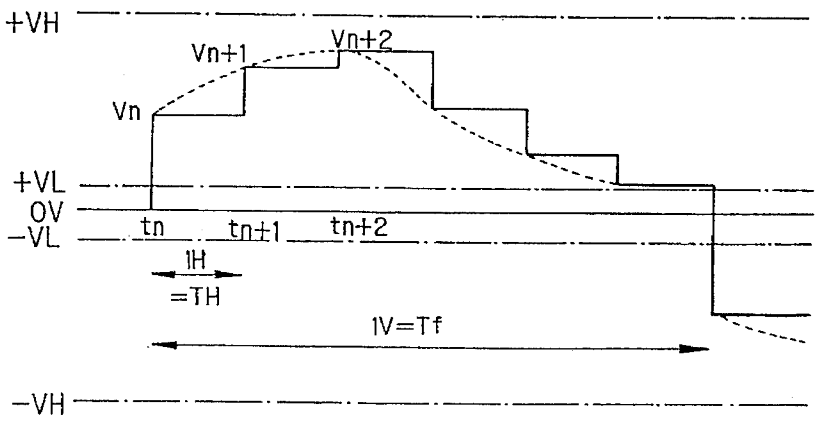
FIG. 6 is a waveform diagram showing a signal voltage applied to the active matrix liquid crystal display apparatus shown in FIG. 3.
Figure 7:
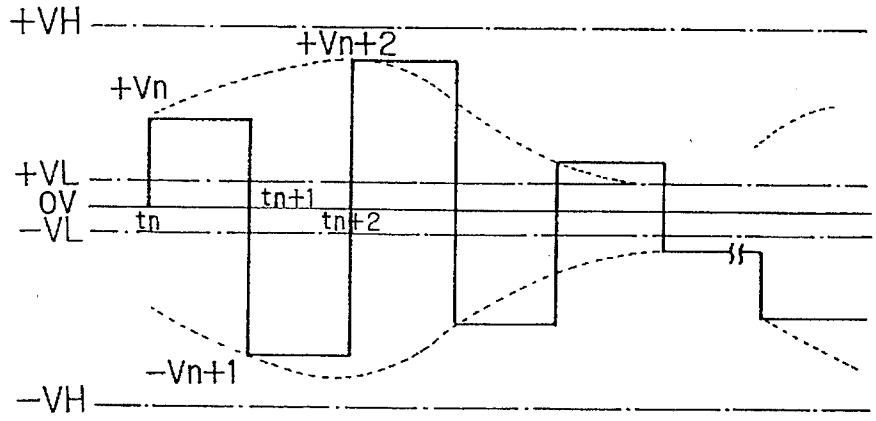
FIG. 7 is a waveform diagram likewise showing a signal voltage.
Figure 8:
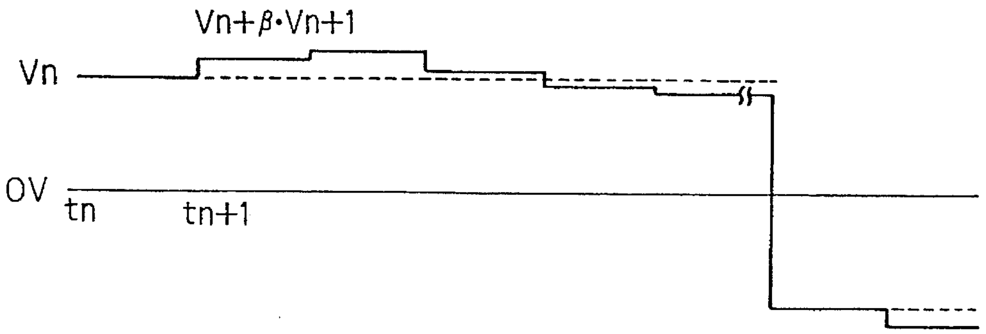
FIG. 8 is a waveform diagram showing a signal voltage fluctuation of a liquid crystal pixel contained in the active matrix liquid crystal display apparatus shown in FIG. 3.
Figure 9:
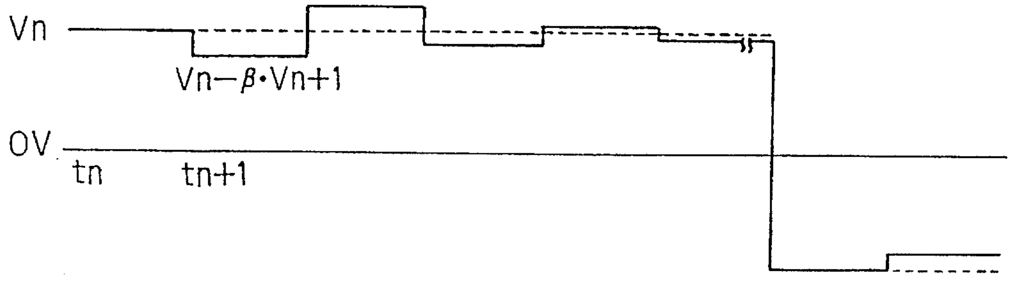
FIG. 9 is a waveform diagram likewise showing a signal voltage fluctuation.

Hereinafter, preferred embodiments of the invention will be described with reference to the accompanying drawings. FIG. 1(A) is a schematic circuit diagram showing an active matrix liquid crystal display apparatus in accordance with one embodiment of the present invention. This embodiment is concerned with an active matrix liquid crystal display apparatus of the plasma address type, which is structurally formed by a laminated panel comprised of a liquid crystal cell and a plasma cell shown in FIG. 3. The liquid crystal display apparatus of this embodiment includes a matrix structure in which scanning lines and signal lines intersect with each other in the form of a matrix, and liquid crystal pixels 21 and switching elements are disposed at the intersections. In this embodiment, the signal lines are comprised of stripe-shaped column transparent electrodes D1, D2, . . . , Dm formed in the liquid crystal cells, and the scanning lines are comprised of stripe-shaped row discharge channels formed in the plasma cells. Each of the row discharge channels are comprised of one cathode K and a pair of anodes A disposed on both sides of the cathode K. The cathodes are arranged in the order K1, K2, K3, . . . , Kn−1, Kn, . . . in a vertical direction, whereas the anodes are arranged in the order A1, A2, A3, . . . , An−1, An, . . . in such a manner that the cathodes and anodes are alternated. Consequently, the liquid crystal pixels 21 are regulated by liquid crystal regions which are positioned at intersections of the column transparent electrodes D and the row discharge channels. Also, the switching elements are regulated by discharge channel regions which are similarly positioned at the intersections.

The liquid crystal display apparatus of this embodiment further includes a scanning circuit 22 which selects switching elements row by row through the scanning lines. Specifically, the scanning circuit 22 is connected to the cathodes K of the discharge channels, and the anodes A are grounded. The cathodes K are selected linear-sequentially whereby plasma switching elements comprised of the discharge channels are rendered conductive. The liquid crystal display apparatus also includes a drive circuit 23 which writes signal voltages through the selected plasma switching elements onto the respective liquid crystal elements 21. The scanning circuit 22 and the drive circuit 23 are controlled by the control circuit 24 in such a manner that they are synchronous with each other.

The present invention is characterized in that the drive circuit 23 include means for distributing pulses having pulse heights corresponding to signal voltages to the respective liquid crystal pixels 21 and for controlling the pulses so that the products of the pulse heights and the pulse widths are always kept constant. FIG. 1(B) shows an example of the above-mentioned pulse waveform, which is a case of one-field inversion drive. As shown, in an initial field period, pulses having positive polarity are sequentially supplied to the signal lines (transparent electrodes D). The respective pulses have pulse heights corresponding to the signal voltage (indicated by a dotted line), and the products of the pulse heights and the pulse widths are always kept constant. For example, if a pulse output at a selection timing $t_n$ has a pulse height Vn and a pulse width Wn, then it has an area represented by Vn×Wn=S. This area S represents the effective electrical power of the pulse. A pulse output at the succeeding selection timing $t_{n+1}$ has an area of Vn+1×Wn+1=S which has the same area of that as the previous pulse. After these pulses of the same area S are sequentially output throughout a one-field period, the polarity of the pulses is inverted in the succeeding period.

FIG. 1(C) shows another example of the waveform of the signal voltage pulse, which is a case of a one-line inversion drive. The one-line inversion drive (every row) is the same as the one-field inversion drive shown in FIG. 1(B), except that the polarity of the pulses is inverted every line also known as a row. That is, the area of each pulse is controlled so as to be always constant, for example, the area Vn×Wn of a pulse output at the selection timing $t_n$ is equal to an area Vn+1×Wn+1 of a pulse output at the succeeding selection timing $t_{n+1}$.

Hereinafter, considering one liquid crystal pixel, its effective voltage $v_{nrms}$ will be calculated. In the case of a one-field inversion drive, the effective voltage of the liquid crystal pixel selected at the selection timing $t_n$ is given by the following expression 1:

$$(v_{nrms})^2 = 1/Tf \cdot \{Vn^2 \times TH + (Vn + \beta \cdot V_{n+1})^2 \times Wn + 1 + Vn^2 \times (TH - Wn + 1) + (Vn + \beta \cdot Vn + 2)^2 \times Wn + 2 + Vn^2 \times (TH - Wn + 2) + (Vn + \beta \cdot Vn + 3)^2 \times Wn + 3 + \ldots\} \quad \text{[Exp. 1]}$$

In the above expression 1, the Tf on the right side represents a one-field period and TH represents one-selection period. The first term on the right side represents the effective voltage amount (accurately, the square amount of the effective voltage, hereinafter likewise) written onto a specified liquid crystal pixel at the selection timing $t_n$. Likewise, the second term of the right side represents a change in the amount of the effective voltage superimposed at the succeeding selection timing $t_{n+1}$. The third term represents the effective voltage component appearing at a space section of a pulse applied at the same timing $t_{n+1}$. The fourth term represents the superimposed amount of a pulse at the next selection timing $t_{n+2}$. The fifth term is the effective voltage amount appearing at a space section of the pulse. The sixth term represents the superimposed amount added at the next selection timing $t_{n+3}$. The same description applies to the seventh term and terms after the seventh term.

Subsequently, when the squared term on the left side of the expression 1 is developed and rearranged in accordance with the order of β, the following expression 2 is obtained:

$$(v_{nrms})^2 = 1/Tf\,\{Vn^2 \times TH \times N + 2\beta Vn \times Vn + 1 \times Wn + 1 + 2\beta Vn \times Vn + 2 \times Wn + 2 + \ldots + \beta^2(Vn + 1^2 \times Wn + 1 + Vn + 2^2 \times Wn + 2 + \ldots)\} \quad \text{[Exp. 2]}$$

In the above expression 2, the 0-order term of β is $Vn^2$ ×TH×N, where N represents the total number of scanning lines. As is clear from the expression 1, the term $Vn^2$× Wn+1 in which β is of 0-order which is developed from the second term is canceled out by the $-Vn^2$×Wn+1 appearing in the third term, as a result of which only $Vn^2$×TH remains. Similarly in the other terms, since $Vn^2$×TH remains for every pulse, finally the term in which β is of the 0-order is arranged in the same manner as $Vn^2$×TH×N. Next, in the terms in which β is of the first-order, the terms become $2\beta Vn\times Vn+1\times Wn+1$, $2\beta Vn\times Vn+2\times Wn+2$, . . . Further, in the terms in which β is of the second-order, the terms become $(Vn+1^2\times Wn+1+Vn+2^2\times Wn+2+\ldots)$.

In the above-mentioned mathematical expression 2, since the terms in which β is of the second-order are sufficiently small, they are ignored and the effective voltage is approximately calculated with the result of the following mathematical expression 3:

$$(v_{nrms})^2 \approx 1/Tf\,(Vn^2\times TH\times N+2\beta Vn\times S\times N) \qquad \text{[Exp. 3]}$$

In the expression 2, all of $Vn+1\times Wn+1$, $Vn+2\times Wn+2$, . . . in the terms where β is of the first-order can be replaced with a constant pulse area S. Therefore, as represented in the above expression 3, the effective voltage $v_{nrms}$ of a specified liquid crystal pixel is finally obtained as $Vn^2\times TH\times N$ and $2\beta Vn\times S\times N$. Accordingly, $v_{nrms}$ includes only Vn as a variable and is not affected by signal voltages assigned to other scanning lines. However, when the field inversion drive is performed, the effective voltage includes an error which is proportional to the signal voltage Vn applied to the liquid crystal pixel of interest.

Subsequently, the effective drive voltage $v_{nrms}$ of the liquid crystal pixel in the case where a one-line inversion drive is provide will be calculated. The results are represented by the following expressions 4, 5 and 6. The expression 4 corresponds to the above-mentioned expression 1, the expression 5 corresponds to the expression 2, and the expression 6 corresponds to the expression 3.

$$(v_{nrms})^2 = 1/Tf\cdot\{Vn^2\times TH+(Vn-\beta\cdot Vn+1)^2\times Wn+1+Vn^2\times(TH-Wn-1)+(Vn+\beta n+2)^2\times Wn+2+Vn^2\times(TH-Wn+2)+(Vn-\beta\cdot n+3)^2\times Wn+3+\ldots\} \qquad \text{[Exp. 4]}$$

$$(v_{nrms})^2 = 1/Tf\cdot\{Vn^2\times TH\times N-2\beta Vn\times Vn+1\times Wn+1+2\beta Vn+Vn+2\times Wn+2-\ldots+\beta^2(Vn+1^2\times Wn+1+Vn+2^2\times Wn+2+\ldots)\} \qquad \text{[Exp. 5]}$$

$$\begin{aligned}(v_{nrms})^2 &\approx 1/Tf(Vn^2\times TH\times N)\\ &= Vn^2\end{aligned} \qquad \text{[Exp. 6]}$$

As is apparent from a comparison of the expression 4 with the expression 1, in the case of a one-line inversion drive, since odd pulses and even pulses have the relationship that they are inverse in polarity, a negative mark is added to $\beta Vn+1$, a positive mark is added to $\beta Vn+2$, a negative mark is added to $\beta Vn+3$, and so on. As a result, as shown in the expression 5, the first-order terms of β are canceled. Therefore, as shown in the expression 6, the effective voltage $v_{nrms}$ of the liquid crystal pixel coincides with Vn so that the cross-talk amount caused by the floating capacities is completely removed.

Figure 2:
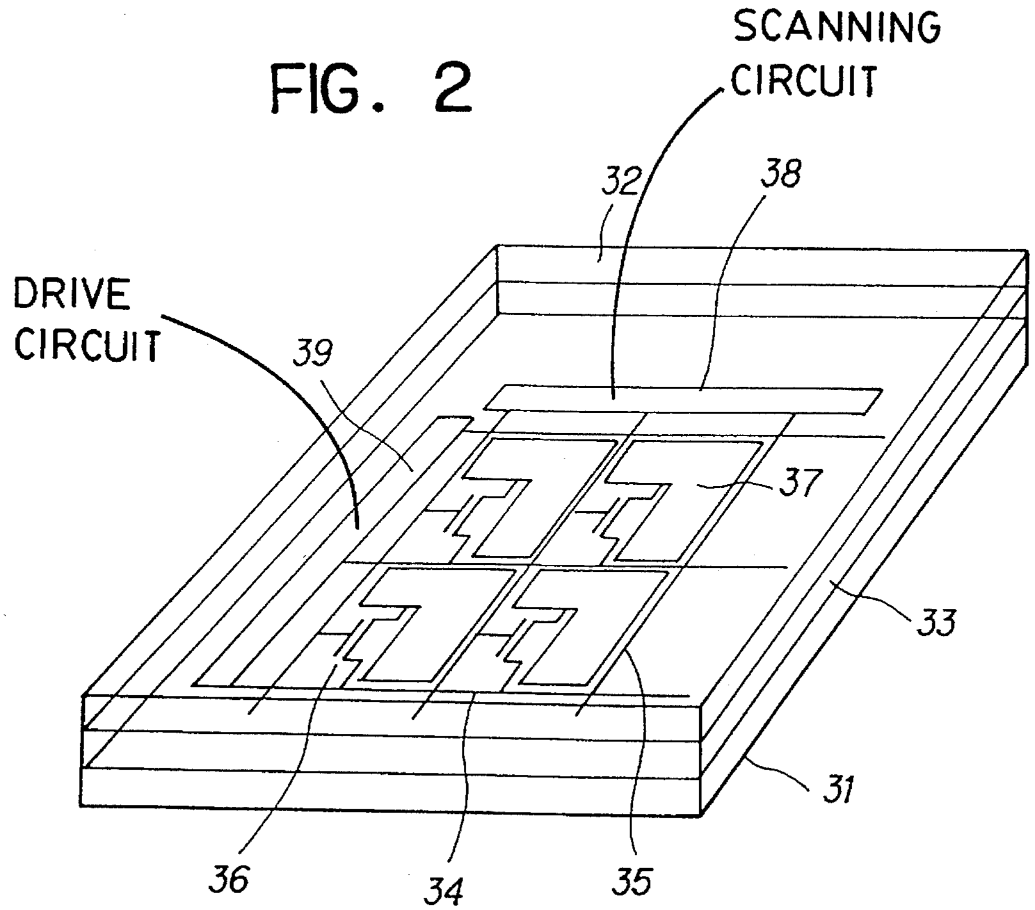
FIG. 2 is a perspective view schematically showing an active matrix liquid crystal display apparatus in accordance with another embodiment of the present invention.

The above-mentioned embodiment is concerned with an active matrix liquid crystal display apparatus of the plasma address type; however, the present invention is not limited to or by this type. For example, the present invention can be applied to an active matrix liquid crystal display apparatus utilizing switching circuit elements such as thin-film transistors as switching elements as shown in FIG. 2. In particular, it is effective to interpose capacitive coupling between the source and the drain of the thin-film transistor used as the switching circuit element. As shown in the figure, the active matrix liquid crystal display apparatus of this embodiment comprises a primary substrate 31 and an opposed substrate 32 which are joined to each other with a predetermined gap provided between them. Liquid crystal 33 is held between the substrates 31 and 32. On the inner surface of the primary substrate 31, wiring patterns which are orthogonal to each other are formed to constitute signal lines 34 and scanning lines 35. At the intersections of the signal lines 34 and the scanning lines 35 there are formed thin-film transistors 36 as the switching circuit elements, as well as corresponding pixel electrodes 37. Gate electrodes of the respective thin-film transistors 36 are connected to the corresponding scanning lines 35, drain electrodes thereof are connected to the corresponding pixel electrodes 37, and source electrodes thereof are connected to the corresponding signal lines 34. On the inner surface of the opposed substrate 32 there are formed opposed electrodes to form liquid crystal pixels between the opposed electrodes and the pixel electrodes 37.

A scanning circuit 38 and a drive circuit 39 are also integrally formed on the inner surface of the primary substrate 31. The scanning circuit 38 selects the thin-film transistors 36 row by row through the scanning lines 35. The drive circuit 39 writes signal voltages through the selected thin-film transistors 36 via the signal lines 37 onto the respective pixel electrodes 37. With such a structure, the drive circuit 39 includes means for distributing pulses having pulse heights corresponding to the signal voltages to the respective pixel electrodes 37 and for controlling the pulses in such a manner that the products of the pulse heights and the pulse widths are always kept constant. As a result, cross-talk caused by capacitive coupling which is parasitic between the sources and drains of the thin-film transistors 36 can be effectively suppressed.

As described above, according to the present invention, since pulses having pulse heights corresponding to the signal voltages are distributed to the respective liquid crystal pixels, and the products of the pulse heights and the pulse widths are controlled so as to be always kept constant, the fluctuation of the signal voltage due to the floating capacitance existing in the switching elements can be restrained to thereby remove cross-talk, and as a result the image quality of the active matrix liquid crystal display apparatus can be improved.

Although alter the last line insert the following paragraph: various minor changes and modifications might be proposed by those skilled in the art, it will be understood that I wish to include within the claims of the patent warranted hereon all such changes and modifications as reasonably come within my contribution to the art.

What is claimed is:

1. An active matrix liquid crystal display device, comprising:

scanning lines and signal lines intersecting in the form of a matrix;

liquid crystal elements and switching elements disposed at the intersections of the scanning lines and the signal lines;

a scanning circuit for selecting the switching elements row by row through the scanning lines; and a drive circuit for providing signal voltages to the respective liquid crystal pixels through the signal lines and through the selected switching elements, the drive circuit having means for supplying each pixel with a pulse having a height corresponding to a signal voltage and wherein the pulses differ in width, and controlling the pulses so that a product of pulse height and pulse width is the same for all the pulses.

2. An active matrix liquid crystal device according to claim 1, wherein:

the signal lines and the scanning lines comprise wiring patterns formed on a first substrate;

the switching elements comprise switching circuit elements formed on the first substrate; and the liquid crystal pixels comprise pixel electrodes formed on the first substrate, facing electrodes formed on a second substrate disposed facing the first substrate, and liquid crystal regions interposed between the pixel electrodes and the facing electrodes.

3. An active matrix liquid crystal device according to claim 1, wherein:

the drive circuit is provided with means for inverting the polarity of the pulses every row.

4. An active matrix liquid crystal device according to claim 1, wherein:

the drive circuit is provided with means for inverting the polarity of the pulses every field.

5. An active matrix liquid crystal display device, comprising:

scanning lines and signal lines intersecting in the form of a matrix;

liquid crystal elements and switching elements disposed at the intersections of the scanning lines and the signal lines;

a scanning circuit for selecting the switching elements row by row through the scanning lines;

a drive circuit for providing signal voltages to the respective liquid crystal pixels through the signal lines and through the selected switching elements, the drive circuit having means for supplying each pixel with a pulse having a height corresponding to a signal voltage and wherein the pulses differ in width, and controlling the pulses so that a product of pulse height and pulse width is the same for all the pulses;

the signal lines comprising stripe-shaped column transparent electrodes formed in liquid crystal cells containing liquid crystal;

the scanning lines comprising stripe-shaped row discharge channels forming plasma cells superimposed on the liquid crystal cells; and the switching elements comprising regions of the discharge channels located at the intersections.

6. An active matrix liquid crystal device according to claim 5, wherein:

the liquid crystal is held between facing substrates and the column transparent electrodes are formed on the inner surface of one of the substrates.

7. A drive circuit of an active matrix liquid crystal display device having liquid crystal pixels and switching elements at intersections of scanning lines and signal lines disposed in the form of a matrix, which drive circuit, when the device performs image display by switching elements being selected row by row through tire scanning lines and signal voltages being written through the signal lines and through the selected switching elements into the respective liquid crystal pixels, supplies each pixel with a pulse having a height corresponding to a signal voltage, the supplied pulses differing in width, and the drive circuit controlling the pulses so that a product of pulse height and pulse width is the same for all the pulses.

* * * * *